D. BERGER.
FLY SHIELD.
APPLICATION FILED APR. 29, 1908.
907,719.
Patented Dec. 29, 1908.
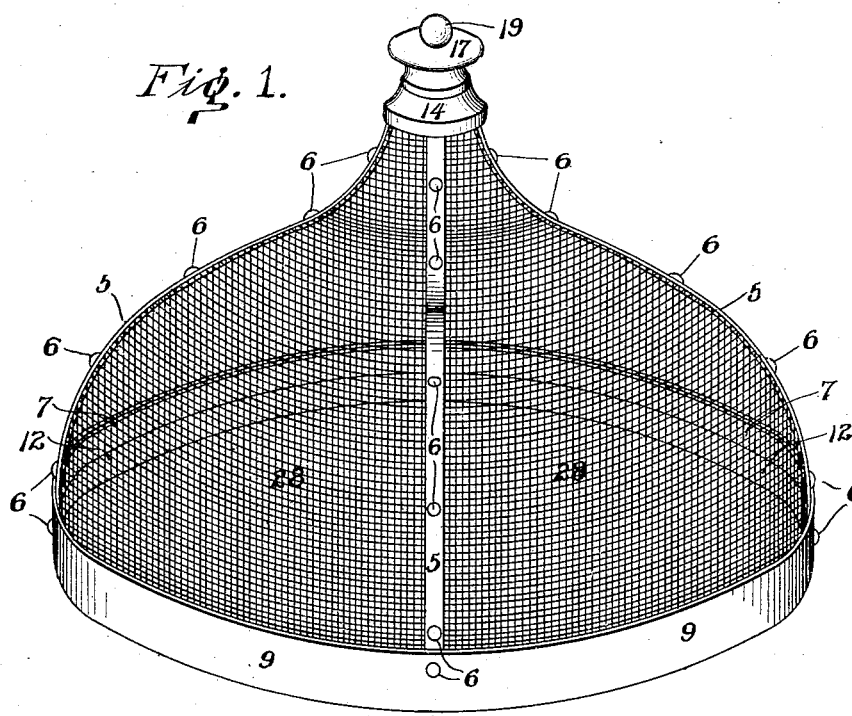
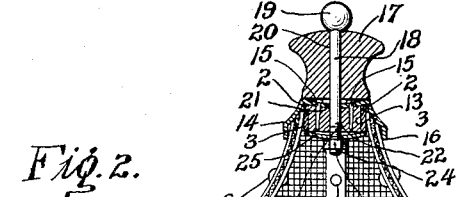
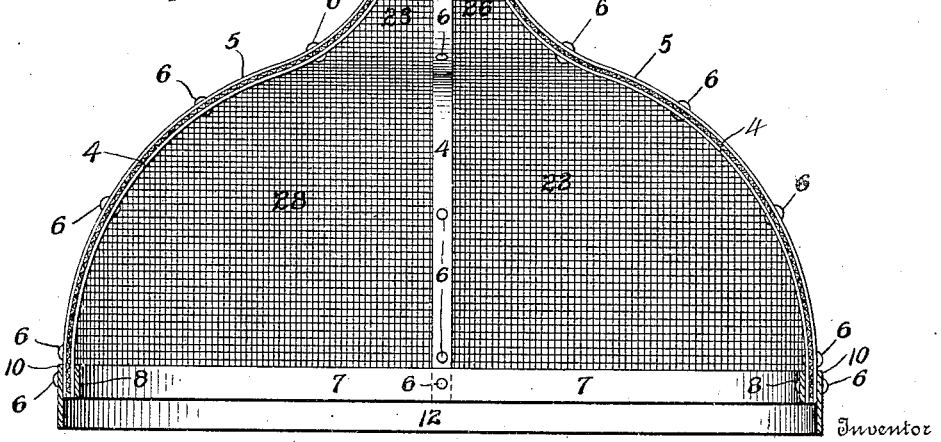
Witnesses
Daniel Webster, Jr.
Etta O'Kane.
Inventor
DEZSO BERGER.
By J. S. Prenner
Attorney

UNITED STATES PATENT OFFICE.

DEZSO BERGER, OF PHILADELPHIA, PENNSYLVANIA.

FLY-SHIELD.

No. 907,719.     Specification of Letters Patent.     Patented Dec. 29, 1908.

Application filed April 29, 1908. Serial No. 429,870.

*To all whom it may concern:*

Be it known that I, DEZSO BERGER, a citizen of Austria-Hungary, residing at Philadelphia, in the county of Philadelphia and State of Pennsylvania, have invented a new and useful Improvement in Fly-Shields, of which the following is a specification.

My invention relates to an article of manufacture in the nature of a funnel-shaped fly shield specially designed to cover food stuffs so as to exclude flies from the food without excluding a free circulation of air, and designed to be easily put on and off.

Generally my invention comprehends a funnel shaped body made of flexible gauze, provided with horizontal ribs to prevent the body from collapsing inward and with rims to make a smooth and uniform edge to rest closely around a surface supporting the food stuffs at one end and a neck to support a knob at the other end, as will hereinafter be fully described and claimed and illustrated in the accompanying drawing, in which—

Figure 1 is a perspective view of my improved fly-shield, and Fig. 2 is a vertical cross section thereof.

A short strip of metal is bent in the form of a circle 2. Strips are soldered around the circle 2 at 3 and bent in the proper shape to form inner ribs 4. A piece of gauze 28 is then covered over said ribs and meeting over an inner rib 4, and under an outer rib 5 placed over the rib 4 and are joined together by rivets 6. A long strip is then bent in a circle 7 and slipped on the inside of the inner ribs as at 8. A long and wide strip is then bent in a circle 9 and slipped on the outside of the ribs as at 10, covering the strip 7 and projecting downward to form a rim as at 12.

A stopper 13, fastened within a cover 14 by means of tags 15, is inserted within the circle 2 with the cover 14 surrounding the ribs 5 as at 16. A knob 17 is placed on top of the stopper 13. A rod 18 provided with a head 19 at one end and threaded at the other end as at 23 is passed through a hole 20 of the knob 17, a hole 21 of the cover 14 and a hole 22 of the stopper 13 with its head 19 on top of the knob 17, and with the threaded portion 23 projecting inward as at 24. A washer 25 is then slipped over the threaded portion 23 and a nut 26 screwed below the washer.

Having thus described my invention what I claim as new and desire to protect by Letters Patent, is—

As a new article of manufacture, a fly-shield consisting of a flexible gauze-like material formed in the shape of a funnel provided with a wide mouth and a narrow neck, and mounted over a frame consisting of horizontal strips properly spaced to support the funnel, a circular strip surrounded by the neck of the funnel and joined with the horizontal strips, a stopper provided with a hole inserted within the neck, a cover attached to the stopper surrounding and overlapping the neck, a knob provided with a hole mounted on top of the neck, a rod provided with a head to rest against the knob passing through the holes of the knob, cover, and stopper and threaded to receive a nut, a washer between the stopper and the nut, and two circular strips one on the inside of the mouth and one on the outside and joined together and with the horizontal strip and funnel.

DEZSO BERGER.

Witnesses:
BENJAMIN WEIMAN,
MICHAEL BROWN.